United States Patent [19]

Santi

[11] Patent Number: 4,520,288

[45] Date of Patent: May 28, 1985

[54] IGNITION MAGNETO HAVING AN IMPROVED PRIMARY WINDING CONSTRUCTION

[75] Inventor: John D. Santi, West Allis, Wis.

[73] Assignee: Briggs & Stratton Corp., Wauwatosa, Wis.

[21] Appl. No.: 596,860

[22] Filed: Apr. 5, 1984

[51] Int. Cl.³ .............................................. H02K 15/04
[52] U.S. Cl. ................................ 310/194; 310/70 R; 310/153; 336/192; 336/198
[58] Field of Search ............... 310/70 R, 43, 208, 269, 310/68 R, 74, 149, 214, 45, 194, 260, 153, 198; 336/192, 198; 123/149 R, 149 A, 149 D

[56] References Cited

U.S. PATENT DOCUMENTS

| | | | |
|---|---|---|---|
| 1,481,190 | 1/1924 | Durbin et al. | 310/194 |
| 1,506,746 | 9/1924 | Griffith | 336/198 |
| 2,225,180 | 12/1940 | Oleson | 242/116 |
| 3,114,851 | 12/1963 | Santi | 310/153 |
| 3,339,097 | 8/1967 | Dunn | 310/194 |
| 3,368,177 | 2/1968 | Hilgers | 336/198 |
| 3,461,413 | 8/1969 | Randolph et al. | 336/198 |
| 4,407,256 | 10/1983 | Wolf | 123/149 R |

Primary Examiner—Peter S. Wong
Assistant Examiner—D. L. Rebsch
Attorney, Agent, or Firm—Andrus, Sceales, Starke & Sawall

[57] ABSTRACT

An ignition magneto having an improved primary wiring assembly that consists of a plastic bobbin having a generally rectangular configuration and composed of a pair of end flanges connected together by a pair of side walls and a pair of end walls. The side edges of each wall are spaced from the side edges of adjacent walls, to provide a gap or slot at each corner of the bobbin. A wire is wound in a plurality of turns around the walls and extends across the slots. One end flange is provided with grooves within which the free ends of the wire are gripped. The primary winding assembly is positioned in a cup-shaped casing around a central upstanding chimney which extends upwardly from the bottom of the casing. After installing a transistor and trigger coil, as well as a secondary winding around the primary winding assembly, the components are potted in the casing with a thermosetting resin.

10 Claims, 9 Drawing Figures

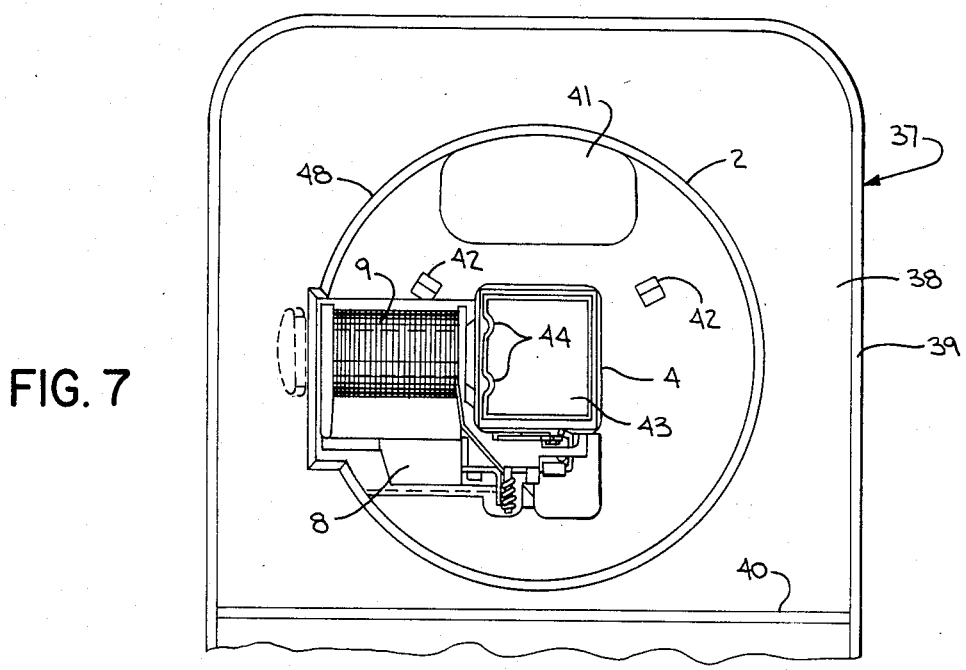
FIG. 7
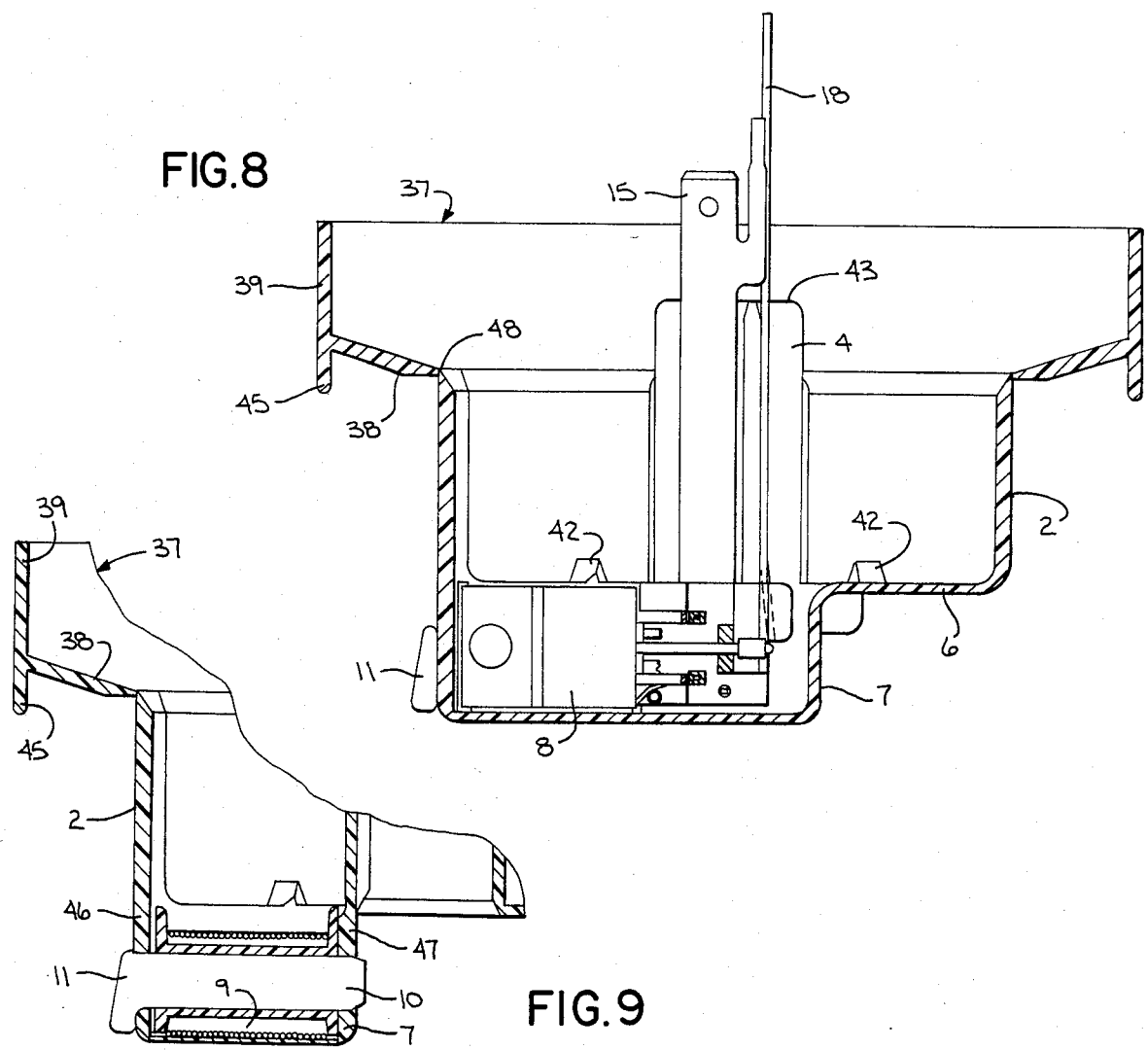
FIG. 8
FIG. 9

IGNITION MAGNETO HAVING AN IMPROVED PRIMARY WINDING CONSTRUCTION

BACKGROUND OF THE INVENTION

With the use of an ignition magneto, it is desirable to obtain maximum output in a minimum period of time and to maintain the maximum output throughout the entire speed range. At low speeds, where little energy is generated, the magneto must be highly efficient. The efficiency of the magneto is dependent in large part on the proximity of the primary winding to the core.

In the past, the primary winding has been hand wound and subsequently taped to hold the windings in place. The primary winding is positioned around an upstanding chimney that extends upwardly from the bottom surface of a cup-shaped plastic casing, and after installation of the secondary winding, the unit is potted in a thermosetting resin. The hand wound or air core winding has the advantage that the primary winding is in close proximity to the iron core, separated only by the thickness of the plastic chimney. However, the hand wound core is extremely expensive from a labor standpoint.

Another manner of producing the primary winding has been to wind the wire on a plastic bobbin, with the free ends of the wire being held in grooves in the end flange of the bobbin. The bobbin is then snap-fitted within an opening in the bottom surface of the casing, and after installation of the secondary winding, the unit is potted. With this method, the bobbin replaces the chimney in the air core method, so that the primary winding is in close proximity to the iron core, being separated only by the wall thickness of the bobbin.

Recently, the transistor and trigger coil have been formed integrally with the outer casing of the ignition magneto. With this type of construction, the transistor and trigger coil are mounted within a depression in the bottom surface of the casing and are potted along with the primary and secondary windings. However, with the integral transistor and trigger core, the snap-in type of bobbin cannot be used, because of a lack of space.

With the use of the integral transistor and trigger coil, the core for the trigger coil has been traditionally inserted after potting. This requires a hole to be drilled through the casing in precise alignment with the opening in the trigger coil for insertion of the core. It has been found that the installation of the trigger core is a difficult and time consuming operation, because of the required precise alignment and minimum tolerances that are involved.

SUMMARY OF THE INVENTION

The invention is directed to an improved method of producing an ignition magneto having an integral transistor and trigger coil. In accordance with the invention, the primary winding is wound on a bobbin of unique configuration. The bobbin is generally rectangular in configuration and consists of a pair of end flanges which are connected together by a pair of opposed side walls and a pair of opposed end walls. The side edges of each wall are spaced from the side edges of adjacent walls to provide gaps or slots at each corner of the bobbin which extend continuously between the end flanges.

The wire is wound around the walls and extends across the gaps, with the free ends of the wire being gripped within grooves formed in one of the end flanges.

As a feature of the invention, the inner surface of each wall of the bobbin is generally flat, while the outer surface of each wall is outwardly curved. During winding, the wire tends to belly-out and the invention takes advantage of the naturally belly-out of the winding to increase the wall thickness and hold the end flanges together.

The bobbin is disposed around an upstanding chimney in the casing and, due to the corner slots, the winding contacts the chimney to reduce the spacing between the wire and the core contained within the chimney. Thus, the invention achieves the advantage of bobbin winding and the substantial cost improvement over hand winding, and yet has the advantage of maintaining the primary winding in close proximity to the core contained within the chimney. This construction increases the efficiency of the ignition magneto, allowing smaller magnets and fewer turns of wire to be employed, thereby producing a less expensive unit.

As a further aspect of the invention, the transistor and trigger-coil are mounted within a depression formed in the bottom of the casing. The walls bordering the depression are formed with opposed openings aligned with the axis of the trigger coil. Prior to potting, the trigger core is inserted into the coil and press fitted within the aligned openings in the casing walls. The press fit prevents leakage of the liquid resin from the casing during potting and eliminates the necessity of drilling holes in the casing after potting to receive the core, as has been done in the past.

Other objects and advantages will appear in the course of the following description.

DESCRIPTION OF THE DRAWINGS

The drawings illustrate the best mode presently contemplated of carrying out the invention.

In the drawings:

FIG. 7 is a top plan view of the coil tray;

FIG. 8 is a vertical section of the structure shown in FIG. 7; and

FIG. 9 is a fragmentary vertical section showing the trigger coil mounted in the casing.

DESCRIPTION OF THE ILLUSTATED EMBODIMENT

Figure 1:
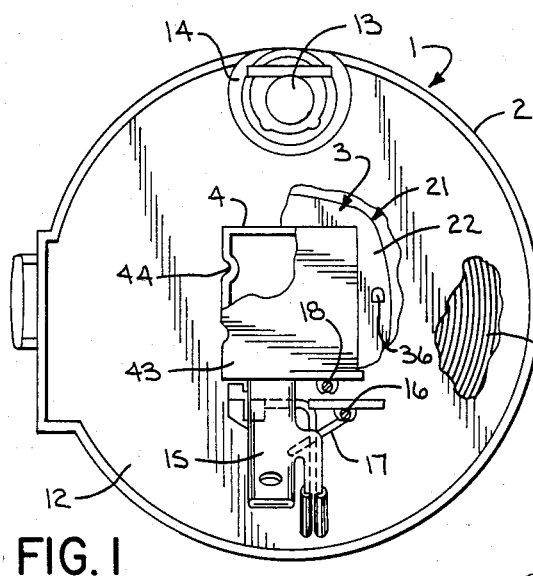
FIG. 1 is a top plan view of the ignition magneto after potting with parts broken away.

FIG. 1 illustrates an ignition magneto 1 that includes an outer cup-shaped platic casing 2. A primary coil assembly 3 is disposed around a central chimney 4 that extends upwardly from the bottom surface of casing 2. The ignition magneto also includes a secondary winding 5 which surrounds the primary winding 3.

The bottom surface 6 of casing 2 is formed with a well or depression 7, and a transistor 8 (FIG. 8) and trigger coil 9 are mounted in the well. A trigger core 10 is inserted within coil 9 and terminates in an enlarged head 11 which is located on the outer surface of casing 2.

In its completed form the primary coil assembly 3, the secondary winding 5, transistor 8 and trigger coil 9 are all potted with a thermosetting resin 12 which fills the cup-shaped casing 2.

Figure 2:
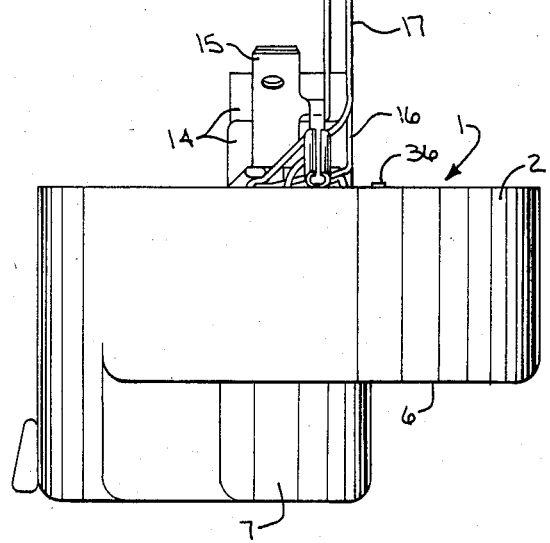
FIG. 2 is an side elevation of the structure shown in FIG. 1.

As shown in FIGS. 1 and 2, a high voltage wire 13 is connected to a cup 14 which extends outwardly of the resin 12 and the wire 13 is connected to the secondary winding. In addition, a primary lead 15 is connected to the transistor, and ground leads 16, 17 and 18 are connected to the primary winding, the secondary winding, and the transistor, respectively. In use, a core, not shown, of the armature is disposed within the hollow interior of chimney 4.

Figure 3:
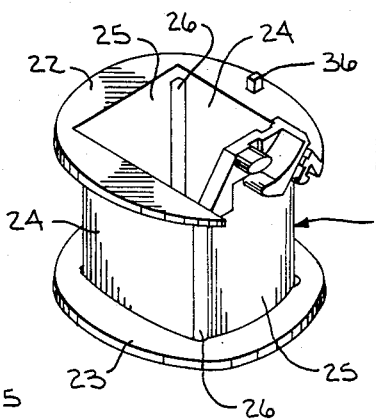
FIG. 3 is a perspective view of the bobbin.
Figure 4:
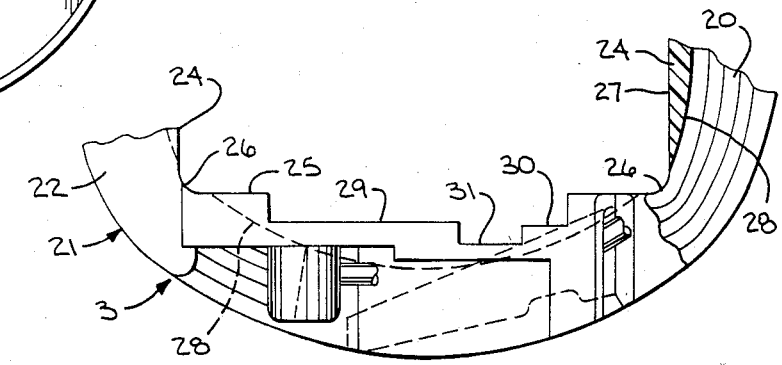
FIG. 4 is an enlarged fragmentary top plan view of the bobbin.
Figure 5:
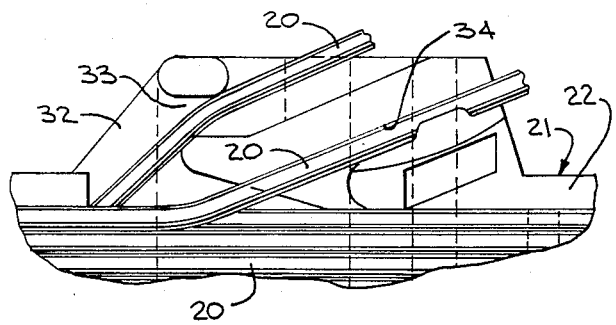
FIG. 5 is an enlarged fragmentary side elevation of the bobbin.

In accordance with the invention, the primary winding assembly 3 includes a wire 20 which is wound in a plurality of turns around a bobbin 21 made of electrically insulating material, such as plastic. Bobbin 21, as best illustrated in FIGS. 3-5, has a generally rectangular shape and includes a pair of end flanges 22 and 23 which are joined together by a pair of opposed side walls 24 and a pair of opposed end walls 25. As best shown in FIG. 3, the side edges of walls 24 and 25 are spaced from the side edges of adjacent walls to provide slots or gaps 26 at the corners of the bobbin which extend continuously between end flanges 22 and 23.

As best shown in FIG. 4, the inner surfaces 27 of walls 24 and 25 are generally flat, while the outer surfaces 28 are curved or bowed outwardly. The wire 20, when wound around the bobbin, tends to belly outward, and the bobbin construction takes advantage of the natural belly in the wire to increase the thickness of walls 24 and 25, to hold the flanges 22 and 23 together. As illustrated in FIG. 4, the turns of the wire 20 extend across the gaps or slots 26, and when the bobbin is installed on the chimney 4, the turns of the wire that are disposed across the slots 26 engage the chimney 4. Thus, the winding 20 will be in close proximity to the core which is located within the chimney, being separated only by the wall thickness of the chimney itself.

As shown in FIG. 4, one of the end walls 25 is provided with a recess 29 which receives the ground lead 18, and recess 29 is separated from a second recess 30 by a separator groove 31. Ground lead 17 is disposed within the recess 30.

Figure 6:
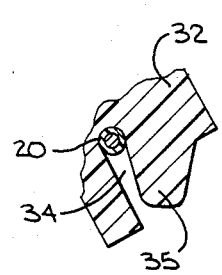
FIG. 6 is a section taken along line 6—6 of FIG. 5.

To secure the ends of the wire 20 to the bobbin 21, the upper end flange 22 is provided with an extension 32 which is formed with a pair of grooves or slots 33 and 34. The starting end of the wire winding 20 is retained within groove 33, while the finish end is retained in groove 34. As best illustrated in FIG. 6, a ledge or shoulder 35 overhangs groove 34, so that the groove 34 is undercut, to securely hold the finished end of the wire winding 20.

The upper flange 22 is also provided with an upwardly extending projection 36 which, in the completed unit, projects outwardly of the resin potting 12 and engages the armature.

The method of forming the primary winding assembly 3 is best illustrated in FIGS. 7-9. A plastic tray 37 includes a series of casings 2, and an upwardly sloping margin 38 connects the outer edge of each casing to an upwardly extending peripheral flange 39. In addition, a transverse flange 40 is located between each of the casings.

As best illustrated in FIG. 7, the bottom surface 6 of each casing is formed with a depression 41 which provides an additional quantity of the potting resin 12 around the terminals of the secondary winding.

In addition, a series of locating nibs 42 are positioned on bottom surface 6 and serve to hold the secondary winding 5 above the bottom surface 6, so that the potting resin can flow beneath the secondary winding.

In the initial state, with the casings 2 being integrally connected within tray 37, each chimney 4 is enclosed by a top 43. In addition, a surface of each chimney is provided with a pair of longitudinally extending ribs 44 which engage the core to reduce vibration.

As illustrated in FIG. 8, the tray 37 is provided with a downwardly extending flange 45 at the outer periphery of the margin 38, which adds to the rigidity of the tray during potting of the resin.

To assemble the ignition magneto, transistor 8 and trigger coil 9 are mounted within the well 7. As best shown in FIG. 12, the opposed walls 46 and 47 of well 7 are provided with opposed openings which are aligned with the axis of the trigger coil 9. Core 10 is then inserted through one of the openings, into coil 9 with the head 11 of core 10 being located adjacent the outer surface of wall 46. The press fit between the core 10 and the openings in walls 46 and 47 provides a seal to prevent leakage of the liquid resin from the interior of the casing 2 during potting.

The primary winding assembly 3 is then mounted around the central chimney 4, and the secondary coil 5 is positioned around the primary winding assembly 3. Liquid resin is then poured into the casing 2 to encapsulate the primary winding assembly 3, the secondary winding 5, as well as the trigger coil 9 and transistor 8. After the resin has solidified, the casing 2 is broken away from the marginal area 38 along the line 48 and the top 43 cut away from chimney 4 so that sections of core can be inserted from both ends into the chimney.

The resulting ignition magneto has the advantage of having the primary coil wound about a bobbin and yet the primary windings, because of the slots 26 along the corners of the bobbin, are in close proximity to the core, to provide improved efficiency for the magneto.

Various modes of carrying out the invention are contemplated as being within the scope of the following claims particularly pointing out and distinctly claiming the subject matter which is regarded as the invention.

I claim:

1. A primary winding assembly for an ignition magneto, comprising a bobbin composed of electrically insulating material and having a generally rectangular configuration, said bobbin comprising a pair of end flanges and a pair of opposed first walls connected to said end flanges and a pair of opposed second walls interconnecting said end flanges, the side edges of each wall being spaced from the side edges of adjacent walls to provide a longitudinally extending slot at each corner of said bobbin, and a wire wound in a plurality of turns around the walls and extending across said slots.

2. The assembly of claim 1, and including means associated with one of said end flanges to grip the free ends of the wire.

3. The assembly of claim 1, wherein each wall has a generally flat inner surface and each wall has an outwardly curved outer surface.

4. The assembly of claim 1, wherein said slots extend continuously between said end flanges.

5. A primary winding assembly for an ignition magneto, comprising a bobbin formed of an electrically insulating material and having a generally rectangular configuration, said bobbin including a pair of end flanges, a pair of opposed first walls interconnecting the end flanges, a pair of opposed second walls interconnecting said end flanges, the side edges of each wall being spaced from the side edges of adjacent walls to provide a longitudinally extending slot at each corner of the bobbin, said slot extending continuously between said end flanges, each wall having a generally flat inner surface and an outwardly curved outer surface, a wire wound in a plurality of turns around said walls and extending across said slots, and means associated with at least one end flange to hold the free ends of said wire.

6. In an ignition magneto for an internal combustion engine, an outer cup-shaped casing formed of an electrically insulating material and having an open top, a central tubular chimney extending upwardly from the bottom surface of said casing, a primary winding assembly disposed around the chimney, a secondary winding assembly disposed around said primary winding assembly, a fused resin disposed within said casing and encapsulating said primary and secondary winding assemblies, a core disposed within said chimney, said primary winding assembly comprising a bobbin formed of an electrically insulating material and having a generally rectangular configuration, said bobbin comprising a pair of end flanges and having a pair of opposed first walls interconnecting said end flanges and a pair of opposed second walls interconnecting said end flanges, the side edges of each wall being spaced from the side edges of adjacent walls to provide a longitudinally extending slot at each corner of said bobbin, said primary winding assembly also including a wire wound in a plurality of turns around said walls and extending across said slots.

7. The ignition magneto of claim 6, and including means associated with at least one of said flanges to hold the free ends of said wire.

8. The ignition magneto of claim 6, wherein each wall has a generally flat inner surface and an outwardly curved outer surface, said turns being in contact with said curved outer surface.

9. The ignition magneto of claim 6, wherein the bottom surface of said casing is provided with a downwardly extending well, a transistor disposed in said well, and a trigger coil disposed in said well.

10. The coil of claim 9, wherein said well is provided with a pair of opposed walls, said opposed walls having openings disposed in alignment with the axis of said trigger coil, and a trigger core disposed within said coil and press fitted within said openings.

* * * * *